United States Patent
Wei et al.

(10) Patent No.: US 12,394,096 B2
(45) Date of Patent: Aug. 19, 2025

(54) ERROR CORRECTION METHOD AND DEVICE FOR LINE STRUCTURED LIGHT 3D CAMERA, COMPUTER DEVICE AND COMPUTER-READABLE STORAGE MEDIUM

(71) Applicant: JIANGSU JITRI INTELLIGENT OPTOELECTRONIC SYSTEM RESEARCH INSTITUTE CO., LTD., Jiangsu (CN)

(72) Inventors: Zhipeng Wei, Jiangsu (CN); Xuyang He, Jiangsu (CN); Yangyang Guo, Jiangsu (CN); Weikang Wu, Jiangsu (CN); Biao Xia, Jiangsu (CN); Wei Yang, Jiangsu (CN); Hao Liu, Jiangsu (CN)

(73) Assignee: JIANGSU JITRI INTELLIGENT OPTOELECTRONIC SYSTEM RESEARCH INSTITUTE CO., LTD., Jiangsu (CN)

( * ) Notice: Subject to any disclaimer, the term of this patent is extended or adjusted under 35 U.S.C. 154(b) by 0 days.

(21) Appl. No.: 18/568,842

(22) PCT Filed: Mar. 28, 2023

(86) PCT No.: PCT/CN2023/084251
§ 371 (c)(1),
(2) Date: Dec. 11, 2023

(87) PCT Pub. No.: WO2024/021654
PCT Pub. Date: Feb. 1, 2024

(65) Prior Publication Data
US 2025/0078320 A1    Mar. 6, 2025

(30) Foreign Application Priority Data
Jul. 28, 2022 (CN) .......................... 202210898609.X (51) Int. Cl.
*G06T 7/80* (2017.01)
*G06T 7/521* (2017.01)

(52) U.S. Cl.
CPC ................ *G06T 7/85* (2017.01); *G06T 7/521* (2017.01)

(58) Field of Classification Search
CPC .. H04N 19/105; H04N 19/159; H04N 19/176; H04N 19/70; H04N 19/13;
(Continued)

(56) References Cited

U.S. PATENT DOCUMENTS 8,326,020 B2 * 12/2012 Lee .................. G01B 11/25
356/604
9,948,920 B2 * 4/2018 Nash .................. G01B 11/25
(Continued)

FOREIGN PATENT DOCUMENTS

| CN | 111932632 | 11/2020 |
|----|-----------|---------|
| CN | 112634373 | 4/2021 |

(Continued)

OTHER PUBLICATIONS

"International Search Report (Form PCT/ISA/210) of PCT/CN2023/084251", mailed on Jul. 4, 2023, pp. 1-5.
(Continued)

*Primary Examiner* — Susan E. Hodges
(74) *Attorney, Agent, or Firm* — JCIPRNET (57) ABSTRACT

An error correction method and device for a line structured light 3D camera. The method comprises: placing a 3D calibration plate at different positions in the field of view of the 3D camera, and allowing a relative motion to scan the 3D calibration plate to obtain multiple sets of point cloud data at different positions; processing the point cloud data and calculating corner coordinates of the 3D calibration plate corresponding to each set of point cloud data; constructing
(Continued)

an error correction model by using an inclination angle, caused by an error, between a straight line along which the relative motion direction lies and a laser plane of the 3D camera as an error model correction parameter; calculating error correction model parameters according to a space vector constraint relationship between corner points; and applying the model to the point cloud data of a measured object to obtain distortion-free point cloud data.

10 Claims, 6 Drawing Sheets

(58) Field of Classification Search
CPC ...... H04N 19/463; H04N 19/52; H04N 19/91; H04N 19/51; G06T 7/80; G06T 7/521; G06T 7/85
USPC .......................................................... 348/46
See application file for complete search history.

(56) References Cited

U.S. PATENT DOCUMENTS

| | | | |
|---|---|---|---|
| 10,127,687 B2* | 11/2018 | Matsuzawa | G01B 11/00 |
| 10,931,924 B2* | 2/2021 | Waldl | G06F 17/16 |
| 2022/0180563 A1 | 6/2022 | Nakano | |

FOREIGN PATENT DOCUMENTS

| | | |
|---|---|---|
| CN | 113902812 | 1/2022 |
| CN | 114332191 | 4/2022 |
| CN | 114758006 | 7/2022 |
| CN | 115170434 | 10/2022 |

OTHER PUBLICATIONS

"Written Opinion of the International Searching Authority (Form PCT/ISA/237) of PCT/CN2023/084251", mailed on Jul. 4, 2023, pp. 1-5.

* cited by examiner

Place a 3D calibration plate at different positions in the field of view of the line structured light 3D camera, and allow a relative motion to occur between the line structured light 3D camera and the 3D calibration plate to scan the 3D calibration plate to obtain multiple sets of point cloud data of the 3D calibration plate at different positions — Step 1

Process the obtained point cloud data and calculate corner coordinates of the 3D calibration plate corresponding to each set of point cloud data — Step 2

Construct an error correction model by using an inclination angle, caused by an error, between a straight line along which the relative motion direction lies and a laser plane of the line structured light 3D camera as an error model correction parameter — Step 3

Calculate error correction model parameters according to a space vector constraint relationship between corner points on the 3D calibration plate — Step 4

Apply the error correction model to the point cloud data of a measured object to obtain distortion-free point cloud data. — Step 5

ERROR CORRECTION METHOD AND DEVICE FOR LINE STRUCTURED LIGHT 3D CAMERA, COMPUTER DEVICE AND COMPUTER-READABLE STORAGE MEDIUM

CROSS-REFERENCE TO RELATED APPLICATION

This application is a 371 of international application of PCT application serial no. PCT/CN2023/084251, filed on Mar. 28, 2023, which claims the priority benefit of China application no. 202210898609.X, filed on Jul. 28, 2022. The entirety of each of the above mentioned patent applications is hereby incorporated by reference herein and made a part of this specification.

TECHNICAL FIELD

The invention relates to the field of 3D vision technology, and in particular to an error correction method and device for a line structured light 3D camera.

DESCRIPTION OF RELATED ART

With the rapid development of machine vision, the application of 3D vision technology has become increasingly common. In principle, the existing 3D imaging technology mainly includes binocular stereo vision, laser triangulation, structured light 3D imaging, and time-of-flight (ToF), light field imaging, and holographic projection. Among them, binocular stereo vision, line structured light 3D imaging, and surface structured light 3D imaging have higher accuracy, so 3D cameras based on these three principles are widely used in the industrial field. With simple principle, high measurement precision, low cost and high stability, the 3D camera based on single-line structured light has important engineering application value and good market prospects.

According to the angle relationship between a laser plane and a straight line along which the relative motion direction lies, line structured light 3D cameras can be divided into vertical and oblique types. For vertical single-line structured light 3D cameras, after the line structured light 3D camera photographs a laser line profile, the laser line center extraction algorithm is implemented to obtain the center profile of the laser line, and then a single 3D contour line on the surface of a measured object is obtained by operation of the calibrated conversion matrix, and finally multiple contours are combined into a complete 3D point cloud of the surface of the measured object.

Single-line structured light 3D camera imaging requires relative motion between the measured object and the camera. The ideal installation position must satisfy that the straight line along which the relative motion direction lies is completely perpendicular to the laser plane. However, in actual applications, it is difficult to ensure the ideal installation position during installation of 3D cameras. Due to machining errors of mechanical components and installation errors of 3D cameras, it is difficult to ensure that the straight line along which the motion direction lies is completely perpendicular to the laser plane. Once the line structured light 3D camera is tilted during installation, it will cause the collected point cloud to be distorted. This affects the measurement precision of a 3D measurement system. Therefore, studying how to correct the installation errors of line structured light 3D cameras is an important means to improve the reliability of line structured light 3D measurement systems and ensure 3D measurement precision.

BRIEF SUMMARY OF THE INVENTION

In view of the above problems, the invention provides an error correction method and device for a line structured light 3D camera, which effectively solves the problem of point cloud distortion of the line structured light 3D camera due to errors and improves the imaging accuracy of the line structured light 3D camera, thereby providing a guarantee for subsequent high-precision 3D image processing.

The technical solution is as follows: an error correction method for a line structured light 3D camera, including the following steps:

placing a 3D calibration plate at different positions in the field of view of the line structured light 3D camera, and allowing a relative motion to occur between the line structured light 3D camera and the 3D calibration plate to scan the 3D calibration plate to obtain multiple sets of point cloud data of the 3D calibration plate at different positions;

processing the obtained point cloud data and calculating corner coordinates of the 3D calibration plate corresponding to each set of point cloud data;

constructing an error correction model by using an inclination angle, caused by an error, between a straight line along which the relative motion direction lies and a laser plane of the line structured light 3D camera as an error model correction parameter;

calculating error correction model parameters according to a space vector constraint relationship between corner points on the 3D calibration plate; and applying the error correction model to the point cloud data of a measured object to obtain distortion-free point cloud data.

Further, the 3D calibration plate includes a square plane, four sides of the square plane are respectively connected to side planes, and an included angle is formed between the square plane and the side plane.

Further, the operation of processing the obtained point cloud data and calculating corner coordinates of the 3D calibration plate corresponding to each set of point cloud data specifically includes the following steps:

filtering the obtained point cloud data, separating five sets of plane data of the 3D calibration plate into five separate 3D point sets, using a plane fitting method based on a RANSAC algorithm to fit a plane equation of the 3D calibration plate, expressed as:

$$A_n x + B_n y + C_n z + D_n = 0$$

where $A_n$, $B_n$, $C_n$, and $D_n$ are plane parameters of plane n respectively, and n is an integer;

forming a set of simultaneous equations of there plane equations around the four corner points of the square plane, expressed as:

$$\begin{cases} A_0 x + B_0 y + C_0 z + D_0 = 0 \\ A_1 x + B_1 y + C_1 z + D_1 = 0 \\ A_2 x + B_2 y + C_2 z + D_2 = 0 \end{cases}$$

where $A_0$, $B_0$, $C_0$, and $D_0$ are plane parameters of a first plane around the corner points; $A_1$, $B_1$, $C_1$, and $D_1$ are plane parameters of a second plane around the corner points; $A_2$, $B_2$, $C_2$, and $D_2$ are plane parameters of a third plane around the corner points; and solving the three plane equations around the corner points in sequence to obtain the coordinates of the four corner points of the square plane, and obtaining a set of coordinates of the four corner points of the square plane corresponding to each set of point cloud data.

Further, in a case where the line structured light 3D camera photographs the 3D calibration plate, there are inclination angles that have an impact on the measurement precision, including: an inclination angle formed by rotating the line structured light 3D camera around the Z-axis of the world coordinate system by α degrees, an inclination angle formed by rotating the line structured light 3D camera around the X-axis of the world coordinate system by β degrees, an inclination angle α relative to the X-axis of the world coordinate system, and an inclination angle β relative to the Z-axis of the world coordinate system; the Y-axis of the world coordinate system is parallel to the relative motion direction of the line structured light 3D camera when photographing the 3D calibration plate; the error correction model is constructed as:

$$[X'\ Y'\ Z']^T = \begin{bmatrix} \cos\alpha & 0 & 0 \\ \sin\alpha & 1 & \sin\beta \\ 0 & 0 & \cos\beta \end{bmatrix} * [X\ Y\ Z]^T$$

where $[X\ Y\ Z]^T$ represents distorted point coordinates, $[X'\ Y'\ Z']^T$ represents corrected 3D point coordinates, and α and β are error correction model parameters, respectively.

Further, the operation of calculating the error correction model parameters according to a space vector constraint relationship between the corner points on the 3D calibration plate includes the following steps:

determining the space vector constraint relationship between the corner points on the 3D calibration plate, including that the square plane of the 3D calibration plate satisfies that the inner product of diagonal vectors is 0 and that the two diagonal module lengths of the square plane of the 3D calibration plate are $\sqrt{2}$ times the side lengths of the square plane;

setting the square of the inner product of a single set of corrected diagonal vectors of the 3D calibration plate as an objective function, wherein the objective function is expressed by the corner point coordinates and the error correction model parameters;

using the Lagrange multiplier method to solve the objective function, and setting an optimization function according to multiple sets of corner point data of the 3D calibration plate; setting constraints in the Lagrange multiplier method as that the square plane of the 3D calibration plate satisfies that the inner product of diagonal vectors is 0 and that the two diagonal module lengths of the square plane of the 3D calibration plate are $\sqrt{2}$ times the side lengths of the square plane; and establishing a Lagrangian function, setting the first-order partial derivative of the Lagrangian function for each error correction model parameter and Lagrangian multiplier to be equal to zero, and solving the function to obtain the error correction model parameters.

Further, the operation of solving the function to obtain the error correction model parameters according to the space vector constraint relationship between the corner points on the 3D calibration plate includes:

setting the error correction model as $x_1=\cos\alpha$, $x_2=\sin\alpha$, $x_3=\sin\beta$, $x_4=\cos\beta$, and arranging the four corner points of the square plane of the 3D calibration plate clockwise respectively as A, B, C and D, satisfying, after correction, that the inner product of the diagonal vectors is 0, expressed as $\vec{AC} \cdot \vec{BD}=0$, and that the two diagonal module lengths are $\sqrt{2}$ times the side lengths of the square plane, expressed as $|\vec{AC}|=|\vec{BD}|=\sqrt{2}\ L$, where L is the side length of the square plane of the 3D calibration plate;

setting the square of the inner product of a single set of corrected diagonal vectors of the 3D calibration plate as an objective function:

$$f(x_1, x_2, x_3, x_4) = \left(\vec{AC} * \vec{BD}\right)^2 = ((P_c - P_a) \cdot (P_d - P_b))^2 = ((\Delta X_{ac} *$$
$$x_1, \Delta Y_{ac} + \Delta X_{ac} * x_2 + \Delta Z_{ac} * x_3, \Delta Z_{ac} * x_4) \cdot (\Delta X_{bd} * x_1, \Delta Y_{bd} + \Delta X_{bd} * x_2 +$$
$$\Delta Z_{bd} * x_3, \Delta Z_{bd} * x_4))^2$$

where $\Delta X_{bd}$ represents the X-axis coordinate difference of two points B and D, $\Delta Y_{bd}$ represents the Y-axis coordinate difference of the two points B and D, and $\Delta Z_{bd}$ represents the Z-axis coordinate difference of the two points B and D; $\Delta X_{ac}$ represents the X-axis coordinate difference of two points A and C, $\Delta Y_{ac}$ represents the Y-axis coordinate difference of the two points A and C, and $\Delta Z_{ac}$ represents the Z-axis coordinate difference of the two points A and C;

solving the objective function on the basis of the Lagrange multiplier method, and setting the optimization function as:

$$F(X) = \sum_{i=1}^{n} f_i(x_1, x_2, x_3, x_4)$$

where n is the number of imaging times of the 3D calibration plate at different positions, and $f_i(x_1,x_2,x_3,x_4)$ is the objective function of the 3D calibration plate during an i-th imaging;

setting the optimization function to satisfy the constraints:

$$\begin{cases} \varphi_1(x_1, x_2, x_3, x_4) = |\vec{AC}| = |\Delta X_{ac} * x_1, \Delta Y_{ac} + \\ \quad \Delta X_{ac} * x_2 + \Delta Z_{ac} * x_3, \Delta Z_{ac} * x_4| - L * \sqrt[2]{2} \\ \varphi_2(x_1, x_2, x_3, x_4) = |\vec{BD}| = |\Delta X_{bd} * x_1, \Delta Y_{bd} + \\ \quad \Delta X_{bd} * x_2 + \Delta Z_{bd} * x_3, \Delta Z_{bd} * x_4| - L * \sqrt[2]{2} \\ \varphi_3(x_1, x_2) = \arccos(x_1) - \arcsin(x_2) \\ \varphi_4(x_3, x_4) = \arcsin(x_3) - \arccos(x_4) \end{cases}$$

and satisfy that φi(x)=0, i=1, 2, 3, 4;
establishing a Lagrangian function $$F(x_1, x_2, x_3, x_4, \lambda_1, \lambda_2, \lambda_3, \lambda_4) = \sum_{i=1}^{n} f_i(x_1, x_2, x_3, x_4) + \sum_{i=1}^{4} \lambda_i * \varphi_i(x_1, x_2, x_3, x_4),$$

where $\lambda_i$ is called the Lagrange multiplier; and
calculating partial derivatives for $x_1,x_2,x_3,x_4$, $\lambda_i$ respectively, and then setting the derivatives as 0 and calculating $x_1, x_2, x_3, x_4$, as the error correction model parameters, which are the extreme points in the case where the optimization function satisfies the constraints.

A computer device, including: a processor, a memory and a program;

wherein the program is stored in the memory, and the processor calls the program stored in the memory to execute the described error correction method for a line structured light 3D camera.

A computer-readable storage medium, configured to store a program, the program being configured to execute the described error correction method for a line structured light 3D camera.

In the error correction method for a line structured light 3D camera according to the invention, a 3D calibration plate is designed. The 3D calibration plate at different positions is photographed by a line structured light 3D camera, and then the corner point coordinates on the 3D calibration plate are obtained. Error correction model parameters are set on the basis of possible actual inclination angles that have an impact on measurement precision in the case where the line structured light 3D camera photographs the 3D calibration plate. An error correction model is constructed on the basis of the error correction model parameters. Then, the error correction model parameters are calculated according to the space vector constraints between the corner points on the 3D calibration plate. Finally, the error correction model can be used to correct the point cloud data of a measured object to obtain distortion-free point cloud data. The method of the invention has the following advantages:

1. The 3D calibration plate designed herein has a simple structure and is easy to process. The calibration plate has strong universality and can be reused.

2. In use of the 3D calibration plate designed herein, only the intersection points of plane intersection lines in space are required as feature corner points, thus achieving low algorithm complexity, high robustness and high accuracy.

3. The method of the invention is simple to operate, has high calibration efficiency and is operable. It effectively solves the problem of point cloud distortion caused by the installation errors of the line structured light 3D camera and improves the imaging accuracy of the line structured light 3D camera, thereby providing a guarantee for subsequent high-precision 3D image processing.

4. The method of the invention has universality and expansibility, and can be used in general push-broom 3D imaging situations. The method has universality and can be expanded to application scenarios of oblique line structured light 3D cameras.

DETAILED DESCRIPTION OF THE INVENTION

The line structured light 3D camera requires relative motion between the camera and the objective during imaging. During the building of linear structured light 3D camera imaging systems, most of them rely on mechanical tooling constraints to make the straight line along which the relative motion direction lies parallel to the straight line along which the Y-axis of the 3D camera lies. This will place high requirements on machining and installation accuracy, making it difficult and costly to implement in practical applications. In view of this, the embodiments of the invention provide an error correction method for a line structured light 3D camera, including the following steps:

Step 1: placing a 3D calibration plate at different positions in the field of view of the line structured light 3D camera, and allowing a relative motion to occur between the line structured light 3D camera and the 3D calibration plate to scan the 3D calibration plate to obtain multiple sets of point cloud data of the 3D calibration plate at different positions;

Step 2: processing the obtained point cloud data and calculating corner coordinates of the 3D calibration plate corresponding to each set of point cloud data;

Step 3: constructing an error correction model by using an inclination angle, caused by an error, between a straight line along which the relative motion direction lies and a laser plane of the line structured light 3D camera as an error model correction parameter;

Step 4: calculating error correction model parameters according to a space vector constraint relationship between the corner points on the 3D calibration plate; and Step 5: applying the error correction model to the point cloud data of a measured object to obtain distortion-free point cloud data.

Specifically, in an embodiment of the invention, in Step 1, before use of the line structured light 3D camera, the line structured light 3D camera needs to be calibrated.

A line structured light 3D camera is used to photograph a checkerboard calibration plate, and the pixel coordinates of the corner points on the checkerboard calibration plate in the image are extracted. A homography matrix is obtained according to a correspondence relationship between the pixel coordinates and three-dimensional world coordinates, and then the internal parameter matrix, lens distortion parameter, and external parameter matrix of the camera are obtained. Finally, the optimal parameters are obtained through an optimization method. The relationship between a pixel coordinate system and a world coordinate system is as follows:

$$Z_C \begin{bmatrix} u \\ v \\ 1 \end{bmatrix} = \begin{bmatrix} f_x & 0 & u_0 & 0 \\ 0 & f_y & v_0 & 0 \\ 0 & 0 & 1 & 0 \end{bmatrix} \begin{bmatrix} R & T \\ 0 & 1 \end{bmatrix} \begin{bmatrix} X_W \\ Y_W \\ Z_W \\ 1 \end{bmatrix} = MK \begin{bmatrix} X_W \\ Y_W \\ Z_W \\ 1 \end{bmatrix}$$

where $$f_x = f/d_x, \; f_y = f/d_y, \; f/d_x$$

represents the length of the focal length in the X-axis direction, expressed by pixels;

$$f/d_y$$

represents the length of the focal length in the Y-axis direction, expressed by pixels; $u_0$, $v_0$ represent actual optical center coordinates, also expressed by pixels; M represents an intrinsic parameter of the camera, R and T represent the rotation matrix and translation vector between the camera coordinate system and the world coordinate system, called extrinsic parameters.

An image distortion model includes radial distortion and tangential distortion. The distortion model is expressed as:

$$\begin{cases} x' = x(1 + k_1\rho^2 + k_2\rho^4) + 2p_1xy + p_2(\rho^2 + 2x^2) \\ y' = y(1 + k_1\rho^2 + k_2\rho^4) + 2p_2xy + p_1(\rho^2 + 2y^2) \end{cases}$$

where $\rho$ represents the distance from the coordinates to the origin, $k_1$, $k_2$ represent the radial distortion coefficient, $p_1$, $p_2$ represent the tangential distortion coefficient, (x, y) represents the coordinates in an ideal state, and (x', y') represents coordinates with distortion.

In this step, based on the camera calibration proposed by Zhang Zhengyou, and the maximum likelihood estimation is implemented to optimize the calibration results. Finally, the results obtained by the operation are used as initial values, and LM least squares optimization is implemented to obtain more accurate intrinsic and extrinsic matrices.

In Step 1, before use of the line structured light 3D camera, it is also required to perform laser plane pose calibration for the line structured light 3D camera.

The fan-shaped area projected by a laser device in the line structured light 3D camera can be regarded as an light plane. If we know the laser plane equation, the homography matrix between the image plane and the laser plane can be obtained. The 3D coordinates of the surface of the measured object can be calculated through the homography matrix as follows:

$$s\begin{bmatrix} X \\ Z \\ 1 \end{bmatrix} = \begin{bmatrix} b_{11} & b_{12} & b_{13} \\ b_{21} & b_{22} & b_{23} \\ b_{31} & b_{32} & b_{33} \end{bmatrix} \begin{bmatrix} u' \\ v' \\ 1 \end{bmatrix}$$

where u', v' represent pixel coordinates after lens distortion correction, s represents the scale factor, X and Z represent 3D coordinates in the camera coordinate system;

$$\begin{bmatrix} b_{11} & b_{12} & b_{13} \\ b_{21} & b_{22} & b_{23} \\ b_{31} & b_{32} & b_{33} \end{bmatrix}$$

represents a homography matrix.

The plane equation of the laser plane is expressed as APx+BPy+CPz+DP=0; AP, BP, CP, and DP are plane coefficients of the laser plane.

A backlight checkerboard calibration plate is placed at different positions within the camera's field of view, and the camera takes an image of the backlight calibration plate and an image with the laser line. The COG algorithm is implemented to extract the laser centerline profile, and then the 3D laser line point under the camera coordinate system is obtained through the conversion relationship between the calibration plate coordinate system and the camera coordinate system.

$$\begin{bmatrix} X_C \\ Y_C \\ Z_C \end{bmatrix} = R\begin{bmatrix} X_W \\ Y_W \\ Z_W \end{bmatrix} + T.$$

Theoretically, the laser plane equation can be solved through three non-collinear points. However, to reduce the error, we use multiple sets of 3D point fitting of laser lines to obtain the plane coefficients of the laser plane.

Figure 1:
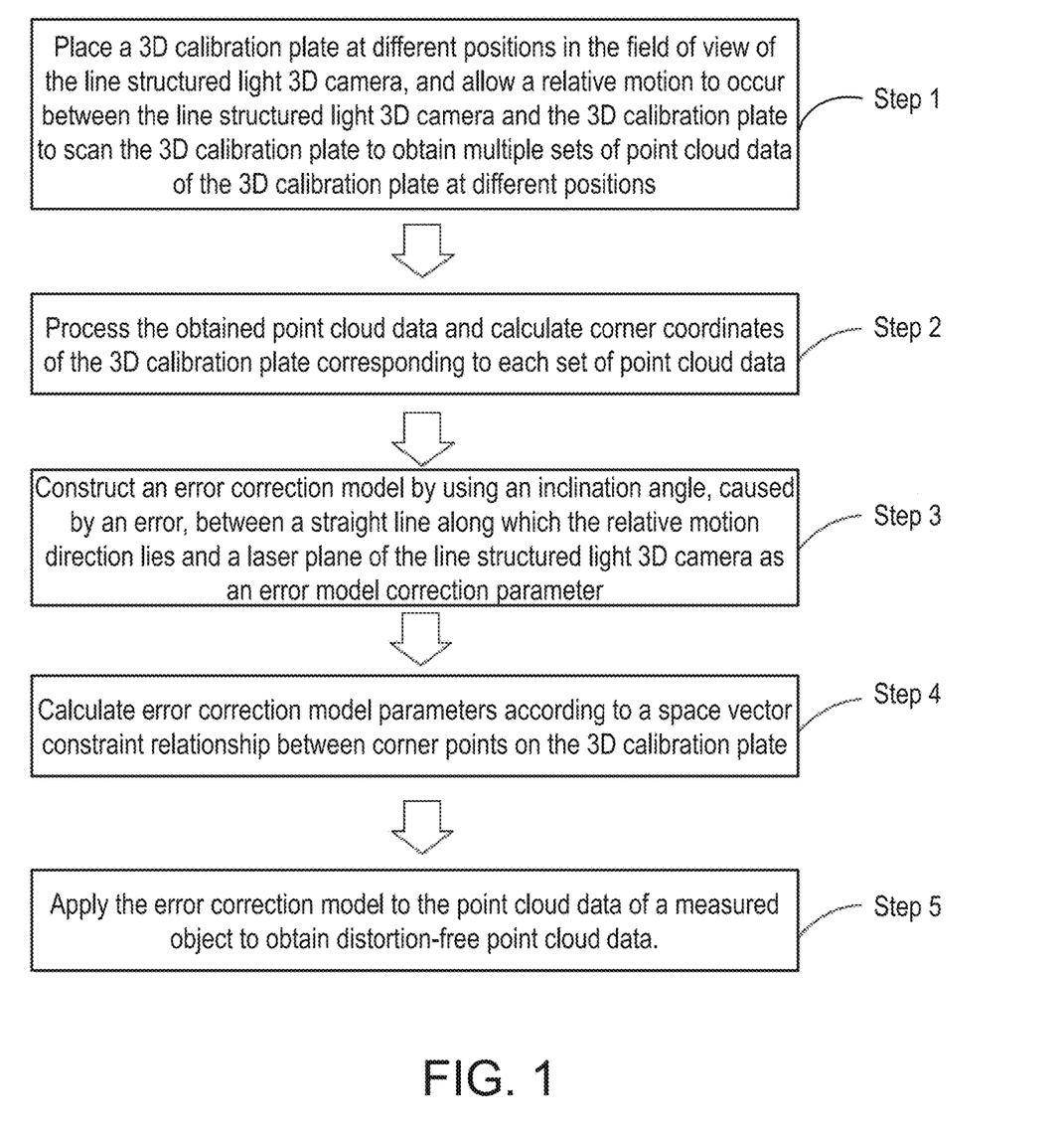
FIG. 1 is a schematic diagram of operation steps of an error correction method for a line structured light 3D camera in an embodiment of the invention.
Figure 2:
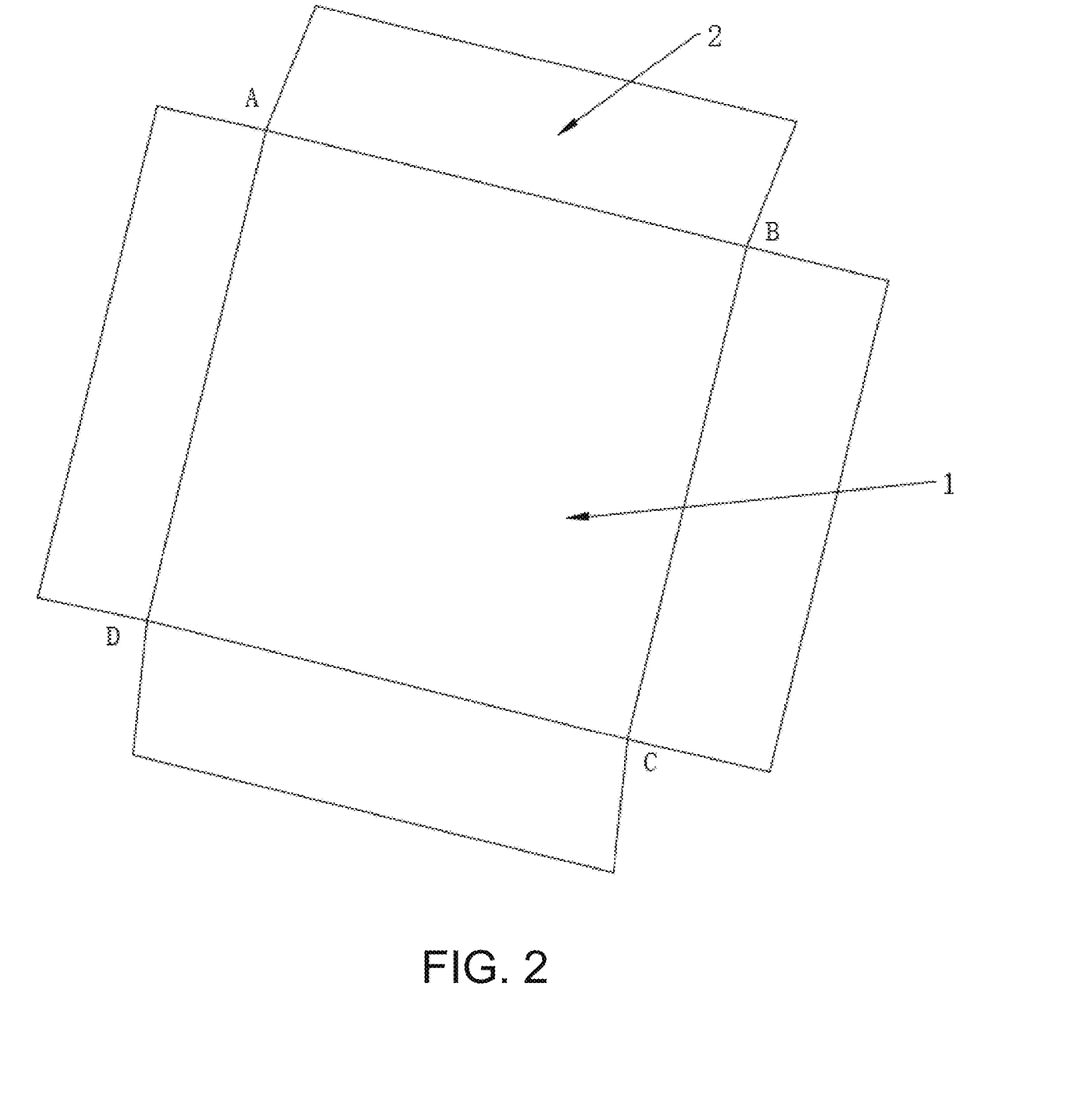
FIG. 2 is a schematic diagram of a 3D calibration plate in the embodiment.

Referring to FIG. 2, the 3D calibration plate used in this step includes a square plane 1. The four sides of the square plane are connected to side planes 2 respectively. An included angle is formed between the square plane 1 and the side plane 2. In this embodiment, the side planes 2 are all rectangular. The value of the included angle between the square plane 1 and the side plane 2 ranges from 15 degrees to 45 degrees. The selection of angle parameters must satisfy that: 1) it can ensure the distinguishing from the square plane in the middle; 2) in a case where the calibration plate has a certain inclination angle in space, it can ensure that enough 3D points can be collected on the five planes in the figure. In this embodiment, the value selected for the included angle is 30 degrees.

After the calibration, the 3D calibration plate designed in this embodiment can be placed in the field of view of the line structured light 3D camera. The relative motion between the line structured light 3D camera and the 3D calibration plate occurs to scan the 3D calibration plate, and then a set of 3D point cloud data of the 3D calibration plate can be obtained. The 3D calibration plate is placed at another position in the field of view of the line structured light 3D camera, relative motion occurs again to scan the 3D calibration plate to obtain another set of 3D point cloud data of the 3D calibration plate. By adjusting the 3D calibration plate to multiple different positions, multiple sets of point cloud data of the 3D calibration plate at different positions can be obtained.

In an embodiment of the invention, in Step 2, the operation of processing the obtained point cloud data and calculating corner coordinates of the 3D calibration plate corresponding to each set of point cloud data specifically includes the following steps:

Step 201: filtering the obtained point cloud data: The point cloud data obtained by scanning may have some noise. In order to improve the subsequent calibration accuracy, the obtained point cloud is first filtered to remove sparse outliers. For each point, calculating a mean distance between the point and all neighbor points Assuming that the result distribution is a Gaussian distribution with mean and standard deviation, all points having mean distances outside the interval defined by the global distance mean and the standard deviation can be considered as sparse outliers, and the outliers are then pruned from the point cloud datasets.

Step 202: separating five sets of plane data of the 3D calibration plate into five separate 3D point sets.

Step 203: using a plane fitting method based on a RANSAC algorithm to fit plane equations of five planes of the 3D calibration plate, expressed as:

$$A_n x + B_n y + C_n z + D_n = 0$$

where $A_n$, $B_n$, $C_n$, and $D_n$ are plane parameters of plane n respectively, and n is an integer;

Step 204: feature corner extraction of the 3D calibration plate: forming a set of simultaneous equations of there plane equations around the four corner points of the square plane, expressed as:

$$\begin{cases} A_0 x + B_0 y + C_0 z + D_0 = 0 \\ A_1 x + B_1 y + C_1 z + D_1 = 0 \\ A_2 x + B_2 y + C_2 z + D_2 = 0 \end{cases}$$

where $A_0$, $B_0$, $C_0$, and $D_0$ are plane parameters of a first plane around the corner points; $A_1$, $B_1$, $C_1$, and $D_1$ are plane parameters of a second plane around the corner points; $A_2$, $B_2$, $C_2$, and $D_2$ are plane parameters of a third plane around the corner points; and solving the three plane equations around the corner points in sequence to obtain the coordinates of the four corner points.

It is known that due to the machining errors of mechanical components and the installation errors of the 3D camera, it is difficult to ensure that the straight line along which the motion direction lies is completely perpendicular to the laser surface. Therefore, in practice, there are inclination angles, caused by errors, between the straight line along which the relative motion direction lies and the laser plane of the line structured light 3D camera. For this reason, in this embodiment, several inclination angles that will have an impact on the measurement precision are analyzed separately.

Figure 3:
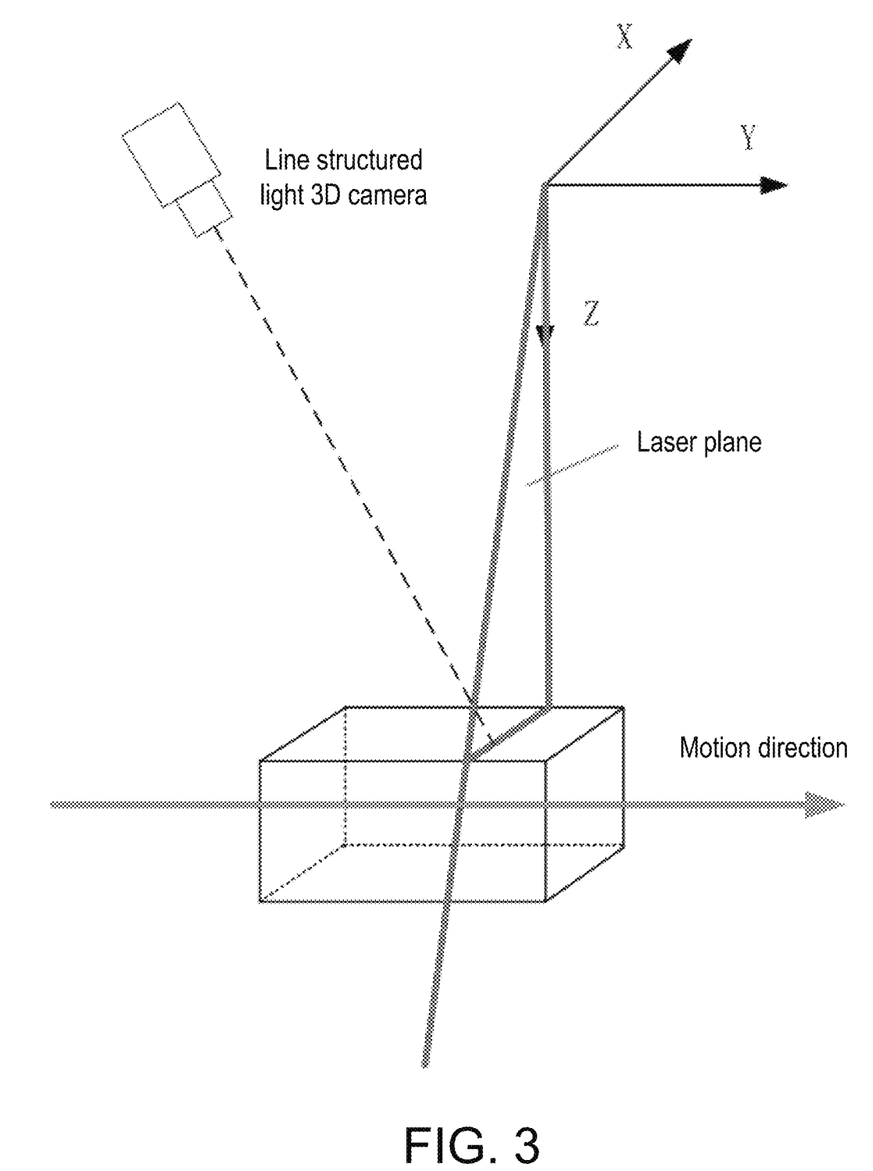
FIG. 3 is a schematic diagram of an object photographed by a line structured light 3D camera.
Figure 4:
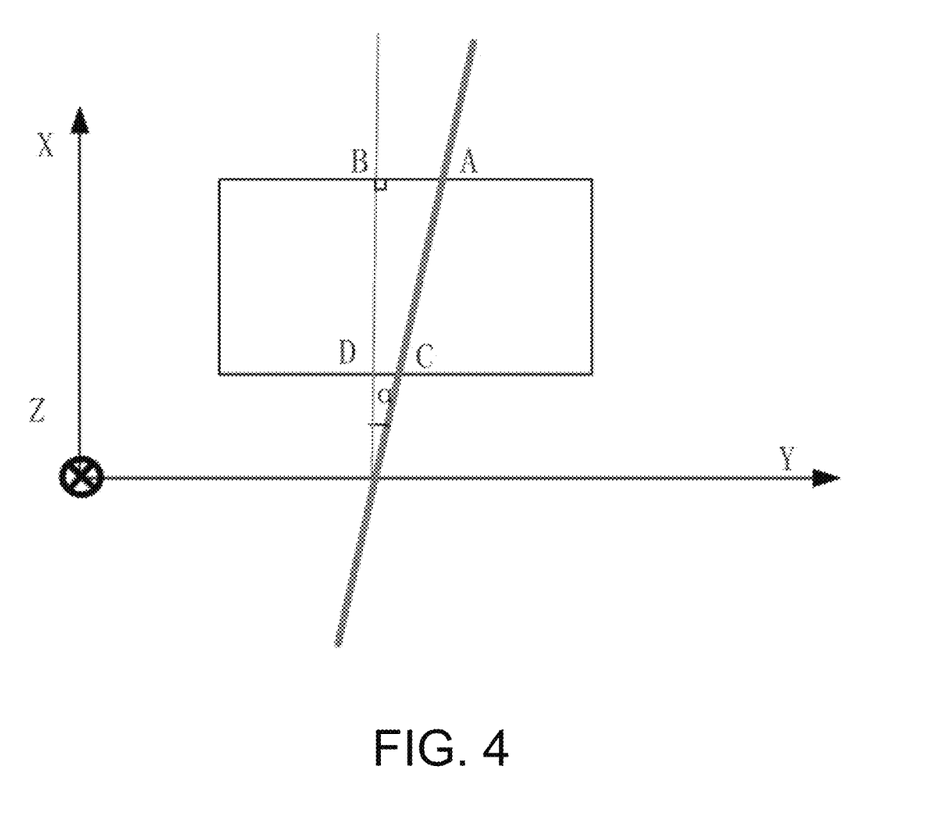
FIG. 4 is a top view of the line structured light 3D camera having an installation error caused by rotating around the Z-axis by $\alpha$ degrees in an actual application.

The schematic diagram of scanning imaging of a vertical line structured light 3D camera is as shown in FIG. 3. The ideal installation position of a line structured light 3D camera is that the straight line along which the motion direction lies is perpendicular to the laser plane. However, due to errors, there are the following three cases:

Case 1: when the line structured light 3D camera to be installed rotates α degrees around the Z-axis of the world coordinate system in the figure, the top view is as shown in FIG. 4. The straight line along which AC lies is the actual laser line, and A and C are imaging points when there is an error of inclination angle α, and B and D are theoretical imaging points. It is easy to know the geometric relationship from the figure:

$$[X' \ Y' \ Z']^T = \begin{bmatrix} \cos\alpha & 0 & 0 \\ \sin\alpha & 1 & 0 \\ 0 & 0 & 1 \end{bmatrix} * [X \ Y \ Z]^T$$

where $[X \ Y \ Z]^T$ represents distorted point coordinates and $[x' \ Y' \ Z']^T$ represents corrected 3D point coordinates.

Case 2: when the line structured light 3D camera to be installed rotates around the Y-axis of the world coordinate system in the figure, it is only equivalent to the different positions of the measured object in the field of view of the line structured light 3D camera, which has no impact on the 3D measurement precision.

Figure 5:
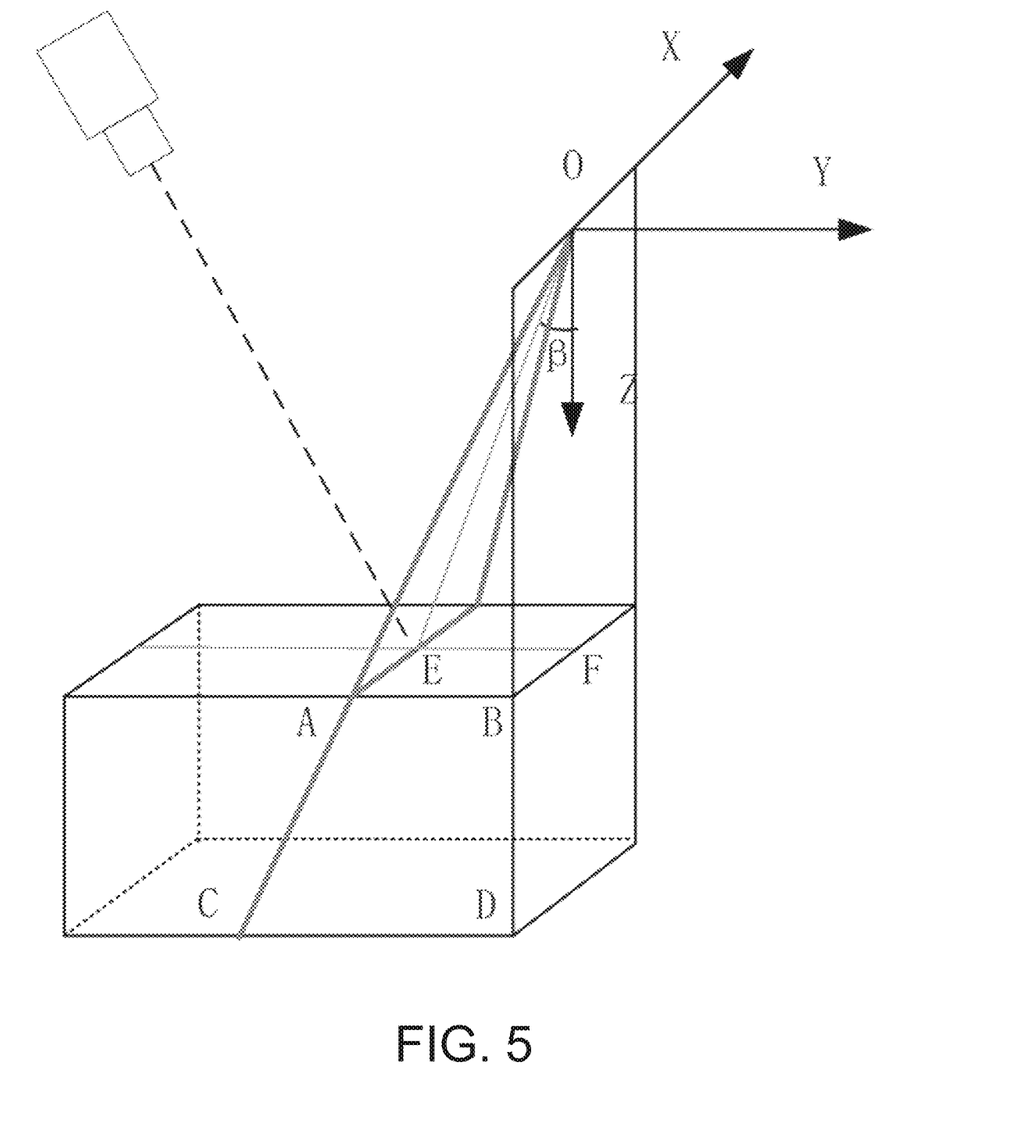
FIG. 5 is a schematic diagram of the line structured light 3D camera having an installation error caused by rotating around the X-axis by $\beta$ degrees in an actual application.

Case 3: when the line structured light 3D camera to be installed rotates β degrees around the X-axis of the world coordinate system in the figure, its main view is as shown in FIG. 5. The straight line along which AC lies is the actual laser line, and A and C are imaging points when there is an error of inclination angle β, and B and D are theoretical imaging points. It is easy to know the geometric relationship from the figure:

$$[X' \ Y' \ Z']^T = \begin{bmatrix} 1 & 0 & 0 \\ 0 & 1 & \sin\beta \\ 0 & 0 & \cos\beta \end{bmatrix} * [X \ Y \ Z]^T$$

where $[X \ Y \ Z]^T$ represents distorted point coordinates and $[x' \ Y' \ Z']^T$ represents corrected 3D point coordinates.

Therefore, in Step 3, in a case where the line structured light 3D camera photographs the 3D calibration plate, there are inclination angles that have an impact on the measurement precision, including: an inclination angle formed by rotating the line structured light 3D camera around the Z-axis of the world coordinate system by α degrees and an inclination angle formed by rotating the line structured light 3D camera around the X-axis of the world coordinate system by β degrees; the Y-axis of the world coordinate system is parallel to the relative motion direction of the line structured light 3D camera when photographing the 3D calibration plate; the error correction model is constructed as:

$$[X' \ Y' \ Z']^T = \begin{bmatrix} \cos\alpha & 0 & 0 \\ \sin\alpha & 1 & \sin\beta \\ 0 & 0 & \cos\beta \end{bmatrix} * [X \ Y \ Z]^T$$

where $[x \ Y \ Z]^T$ represents distorted point coordinates, $[x' \ Y' \ Z']^T$ represents corrected 3D point coordinates, and α and β are error correction model parameters, respectively.

The corresponding point coordinate transformation formula is expressed as:

$$\begin{cases} X' = \cos\alpha * X \\ Y' = Y + \sin\alpha * X + \sin\beta * Z \\ Z' = \cos\beta * Z \end{cases}$$

Because there will be certain errors in the 3D reconstruction and the corner point extraction of the 3D calibration plate, only the optimal solution can be found for the error correction model parameters α and β.

In the invention, Step 4 comprises the following steps:

since the square plane is located in the middle of the 3D calibration plate, determining the space vector constraint relationship between the corner points on the 3D calibration plate, including that the square plane of the 3D calibration plate satisfies that the inner product of diagonal vectors is 0 and that the two diagonal module lengths of the square plane of the 3D calibration plate are $\sqrt{2}$ times the side lengths of the square plane;

setting the square of the inner product of a single set of corrected diagonal vectors of the 3D calibration plate as an objective function, wherein the objective function is expressed by the corner point coordinates and the error correction model parameters;

using the Lagrange multiplier method to solve the objective function, and setting an optimization function according to multiple sets of corner point data of the 3D calibration plate; setting constraints in the Lagrange multiplier method as that the square plane of the 3D calibration plate satisfies that the inner product of diagonal vectors is 0 and that the two diagonal module lengths of the square plane of the 3D calibration plate are $\sqrt{2}$ times the side lengths of the square plane; and establishing a Lagrangian function, setting the first-order partial derivative of the Lagrangian function for each error correction model parameter and the Lagrangian multiplier to be equal to zero, and solving the function to obtain the error correction model parameters.

In a specific embodiment, Step 4 includes:
setting the error correction model as $x_1=\cos\alpha$, $x_2=\sin\alpha$, $x_3=\sin\beta$, $x_4=\cos\beta$, and arranging the four corner points of the square plane of the 3D calibration plate clockwise respectively as A, B, C and D, satisfying, after correction, that the inner product of the diagonal vectors is 0, expressed as $\vec{AC}\cdot\vec{BD}=0$, and that the two diagonal module lengths are $\sqrt{2}$ times the side lengths of the square plane, expressed as $|\vec{AC}|=|\vec{BD}|=\sqrt{2}\,L$, wherein L is the side length of the square plane of the 3D calibration plate;
setting the square of the inner product of a single set of corrected diagonal vectors of the 3D calibration plate as an objective function:

$$f(x_1, x_2, x_3, x_4) = \left(\vec{AC}*\vec{BD}\right)^2 = ((P_c - P_a)\cdot(P_d - P_b))^2 = ((\Delta X_{ac}*x_1,$$
$$\Delta Y_{ac} + \Delta X_{ac}*x_2 + \Delta Z_{ac}*x_3, \Delta Z_{ac}*x_4)\cdot(\Delta X_{bd}*x_1, \Delta Y_{bd} + \Delta X_{bd}*x_2 +$$
$$\Delta Z_{bd}*x_3, \Delta Z_{bd}*x_4))^2$$

where $\Delta X_{bd}$ represents the X-axis coordinate difference of two points B and D, $\Delta Y_{bd}$ represents the Y-axis coordinate difference of the two points B and D, and $\Delta Z_{bd}$ represents the Z-axis coordinate difference of the two points B and D; $\Delta X_{ac}$ represents the X-axis coordinate difference of two points A and C, $\Delta Y_{ac}$ represents the Y-axis coordinate difference of the two points A and C, and $\Delta Z_{ac}$ represents the Z-axis coordinate difference of the two points A and C;
solving the objective function on the basis of the Lagrange multiplier method, and setting the optimization function as:

$$F(X) = \sum_{i=1}^{n} f_i(x_1, x_2, x_3, x_4)$$

where n is the number of imaging times of the 3D calibration plate at different positions, $f_i(x_1,x_2,x_3,x_4)$ is the objective function of the 3D calibration plate during an i-th imaging, and n may be set between 10 and 20;
setting the optimization function to satisfy the constraints:

$$\begin{cases} \varphi_1(x_1, x_2, x_3, x_4) = |\vec{AC}| = |\Delta X_{ac}*x_1, \Delta Y_{ac} + \\ \quad \Delta X_{ac}*x_2 + \Delta Z_{ac}*x_3, \Delta Z_{ac}*x_4| - L*\sqrt[2]{2} \\ \varphi_2(x_1, x_2, x_3, x_4) = |\vec{BD}| = |\Delta X_{bd}*x_1, \Delta Y_{bd} + \\ \quad \Delta X_{bd}*x_2 + \Delta Z_{bd}*x_3, \Delta Z_{bd}*x_4| - L*\sqrt[2]{2} \\ \varphi_3(x_1, x_2) = \arccos(x_1) - \arcsin(x_2) \\ \varphi_4(x_3, x_4) = \arcsin(x_3) - \arccos(x_4) \end{cases}$$

and satisfy that $\varphi_i(x)=0$, i=1, 2, 3, 4;
In order to find the extreme points of the optimization function F(X) under the constraints, the Lagrangian function is first established and expressed as:

$$F(x_1, x_2, x_3, x_4, \lambda_1, \lambda_2, \lambda_3, \lambda_4) = \sum_{i=1}^{n} f_i(x_1, x_2, x_3, x_4) + \sum_{i=1}^{4} \lambda_i * \varphi_i(x_1, x_2, x_3, x_4),$$

where $\lambda_i$ is called the Lagrange multiplier; and
calculating the partial derivatives for $x_1,x_2,x_3,x_4$, $\lambda_i$ respectively, and then setting the derivatives as 0 and then calculating $x_1,x_2,x_3,x_4$ (the obtained $x_1,x_2,x_3,x_4$ are the extreme points in the case where the optimization function satisfies the constraints; and then calculating the error correction model parameters $\alpha$ and $\beta$ according to inverse trigonometric functions.

The Lagrange multiplier method is a method of finding the extreme values of multivariate functions in which variables are subject to one or more conditions. This method converts an optimization problem with n variables and k constraints into an extreme value problem of a system of equations with n+k variables. The application of the Lagrange multiplier method in the invention during the calculation of the error correction model parameters can obtain accurate solutions to the error correction model parameters $\alpha$ and $\beta$.

In Step 5, the error correction model for which the error correction model parameters $\alpha$ and $\beta$ have been calculated is applied to the point cloud data of the measured object, and then distortion-free point cloud data can be obtained.

Due to the machining and assembly accuracy of each component during the building of a linear structured light 3D camera, it is difficult to ensure that the straight line along which the Y-axis of the 3D camera lies in space is parallel to the straight line along which the relative motion direction lies. This will cause distortion in the point cloud obtained by the 3D camera, and the distortion will affect the positioning and measurement precision of the entire 3D system.

In the method provided in this embodiment, the camera parameters and laser plane parameters are first calibrated. After the calibration, the single contour 3D data of the measured object surface can be reconstructed. The 3D calibration plate is scanned by virtue of relative motion to obtain 3D point cloud data of the surface of the calibration plate. The RANSAC algorithm is implemented to fit multiple planes on the surface of the calibration plate, and the intersections of three adjacent planes are calculated as the feature corner points of the 3D calibration plate. An error correction model is constructed according to the imaging principle of laser triangulation, and the solutions to the correction model parameters are found using the Lagrange multiplier method. This method is of great practical significance for improving the accuracy and measurement precision of the measurement system for a vision system based on a line structured light 3D camera.

In the embodiments of the invention, further provided is a computer device, including: a processor, a memory, and a program;
wherein the program is stored in the memory, and the processor calls the program stored in the memory to execute the described error correction method for a line structured light 3D camera.

Figure 6:
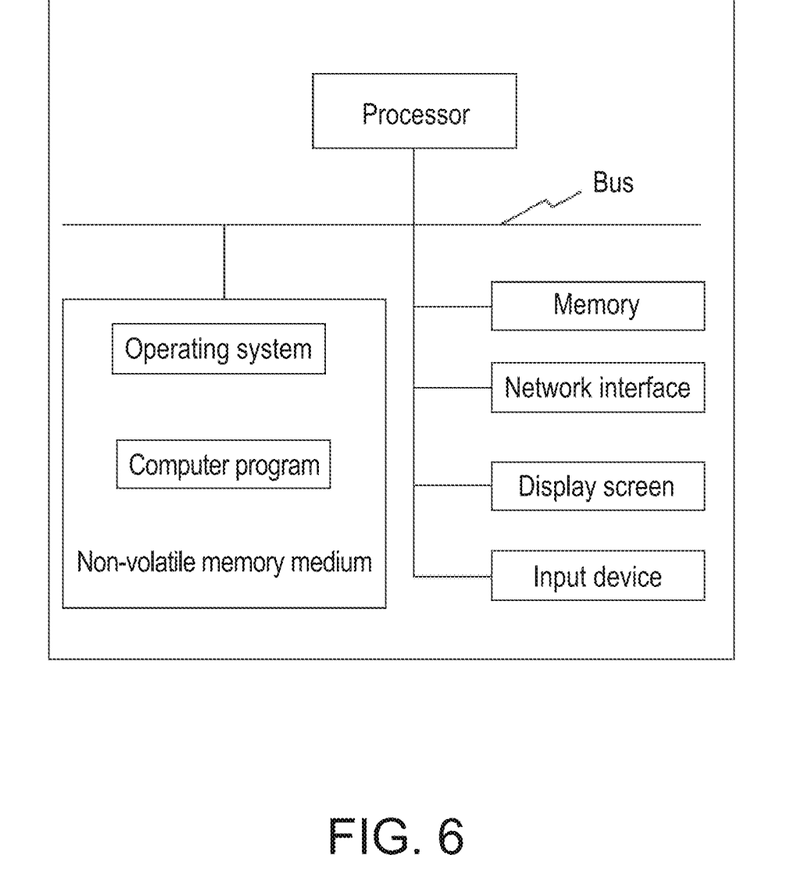
FIG. 6 is an internal structure diagram of a computer device in an embodiment.

The computer device may be a terminal and its internal structure diagram may be as shown in FIG. 6. The computer device includes a processor, a memory, a network interface, a display screen and an input device that are connected by a bus. The processor of the computer device is configured to provide calculation and control capabilities. The memory of the computer device includes a non-volatile memory medium and an internal memory. The non-volatile memory medium stores an operating system and a computer program thereon. The internal memory provides an environment for the operation of the operating system and the computer program in the non-volatile memory medium. The network interface of the computer device is configured to communicate with an external terminal through network connection. The computer program, when executed by a processor, implements an error correction method for a line structured light 3D camera. The display screen of the computer device may be a liquid crystal display or an electronic ink display. The input device of the computer device may be a touch layer covering the display screen, or may be a button, trackball or touchpad provided on a housing of the computer device, or also may be an external keyboard, touchpad, mouse or the like.

The memory may be, but is not limited to, a RAM (Random Access Memory), a ROM (Read Only Memory), a PROM (Programmable Read-Only Memory), an EPROM (Erasable Programmable Read-Only Memory), an EEPROM (Electric Erasable Programmable Read-Only Memory), or the like. The memory is configured to store a program, and the processor executes the program after receiving execution instructions.

The processor may be an integrated circuit chip with a signal processing capability. The above-mentioned processor may be a general-purpose processor, including a CPU (Central Processing Unit), an NP (Network Processor), and the like. The processor may also be other general-purpose processor, DSP (Digital Signal Processor), ASIC (Application Specific Integrated Circuit), FPGA (Field-Programmable Gate Array), or other programmable logic device, discrete gate or transistor logic device, discrete hardware components, etc. The general-purpose processor may be configured as a microprocessor or the processor may also be configured as any conventional processor or the like. It can implement or execute the methods, steps, and logical block diagrams disclosed in the embodiments of the present application. The general-purpose processor may be configured as a microprocessor or the processor may also be configured as any conventional processor or the like.

Those skilled in the art can understand that the structure shown in FIG. 6 is only a block diagram of a part of the structure related to the solution of the present application, and does not constitute a limitation on the computer device to which the solution of the present application is applied. Specifically, the computer device may include more or fewer components than shown in the figure, or may be a combination of some components, or have a different component arrangement.

In the embodiments of the present application, further provided is a computer-readable storage medium, configured to store a program, the program being configured to execute the described error correction method for a line structured light 3D camera.

Those skilled in the art should understand that the embodiments of the invention may be provided as a method, a computer device, or a computer program product. Accordingly, the embodiments of the invention may take the form of an entirely hardware embodiment, an entirely software embodiment, or a combination of software and hardware. Moreover, the embodiments of the invention may take the form of a computer program product implemented on one or more computer storage media (including, but not limited to, disk memories, CD-ROMs and optical memories) including computer program codes.

The embodiments of the invention are described with reference to the flowcharts and/or the block diagrams of the method, computer device, or computer program product according to the embodiments of the invention. These computer program instructions may be provided to the processor of a general-purpose computer, a special-purpose computer, an embedded processor, or other programmable data processing terminal devices to produce a machine such that instructions are executed by the processor of the computer or other programmable data processing terminal devices to generate a device for implementing the functions specified in the flowcharts and/or the block diagrams.

These computer program instructions may also be stored in a computer readable memory that may direct a computer or other programmable data processing devices to function in a particular manner such that the instructions stored in the computer readable memory produce an article of manufacture including an instruction means which implements functions specified in the flowcharts.

The application of the error correction method for a line structured light 3D camera, the computer device, and the computer-readable storage medium of the invention has been stated in detail above. The principles and implementations of the invention are described by way of specific examples. The description of the above embodiments is only used to help understand the method of the invention and its core idea. For those of ordinary skill in the art, there will be changes in the specific implementation and application scope based on the concept of the invention. In summary, the content of this description should not be understood as limiting the invention.

What is claimed is:

1. An error correction method for a line structured light 3D camera, characterized in that, comprising the following steps:
    placing a 3D calibration plate at different positions in a field of view of the line structured light 3D camera, and allowing a relative motion to occur between the line structured light 3D camera and the 3D calibration plate to scan the 3D calibration plate to obtain multiple sets of point cloud data of the 3D calibration plate at the different positions;
    processing the obtained point cloud data and calculating corner coordinates of the 3D calibration plate corresponding to each set of point cloud data;
    constructing an error correction model by using an inclination angle, caused by an error, between a straight line along which a relative motion direction lies and a laser plane of the line structured light 3D camera as an error model correction parameter;
    calculating error correction model parameters according to a space vector constraint relationship between corner points on the 3D calibration plate; and
    applying the error correction model to the point cloud data of a measured object to obtain distortion-free point cloud data.

2. The error correction method for the line structured light 3D camera according to claim 1, wherein the 3D calibration plate comprises a square plane, four sides of the square plane are respectively connected to side planes, and included angles are formed between the square plane and the side planes.

3. The error correction method for the line structured light 3D camera according to claim 2, wherein values of the included angles range from 15 degrees to 45 degrees.

4. The error correction method for the line structured light 3D camera according to claim 2, wherein the operation of processing the obtained point cloud data and calculating the corner coordinates of the 3D calibration plate corresponding to the each set of point cloud data specifically comprises the following steps:
    filtering the obtained point cloud data, separating five sets of plane data of the 3D calibration plate into five separate 3D point sets, using a plane fitting method based on a RANSAC algorithm to fit a plane equation of the 3D calibration plate, expressed as:

$$A_n x + B_n y + C_n z + D_n = 0$$

where $A_n$, $B_n$, $C_n$, and $D_n$ are plane parameters of plane n respectively, and n is an integer;

forming a set of simultaneous equations of three plane equations around the four corner points of the square plane, expressed as:

$$\begin{cases} A_0 x + B_0 y + C_0 z + D_0 = 0 \\ A_1 x + B_1 y + C_1 z + D_1 = 0 \\ A_2 x + B_2 y + C_2 z + D_2 = 0 \end{cases}$$

where $A_0$, $B_0$, $C_0$, and $D_0$ are plane parameters of a first plane around the corner points; $A_1$, $B_1$, $C_1$, and $D_1$ are plane parameters of a second plane around the corner points; $A_2$, $B_2$, $C_2$, and $D_2$ are plane parameters of a third plane around the corner points; and solving the three plane equations around the corner points in sequence to obtain coordinates of the four corner points of the square plane, and obtaining a set of coordinates of the four corner points of the square plane corresponding to the each set of point cloud data.

5. The error correction method for the line structured light 3D camera according to claim 4, wherein the operation of filtering the point cloud data comprises:

for each point, calculating a mean distance between the point and all neighbor points, if the mean distance of the point is outside an interval defined by a global distance mean and a standard deviation, considering the point as a sparse outlier, and removing the sparse outlier from the sets of the point cloud data.

6. The error correction method for the line structured light 3D camera according to claim 4, wherein in a case where the line structured light 3D camera photographs the 3D calibration plate, there are inclination angles that have an impact on a measurement precision, comprising: an inclination angle formed by rotating the line structured light 3D camera around a Z-axis of a world coordinate system by α degrees and an inclination angle formed by rotating the line structured light 3D camera around a X-axis of the world coordinate system by β degrees; a Y-axis of the world coordinate system is parallel to the relative motion direction of the line structured light 3D camera when photographing the 3D calibration plate; the error correction model is constructed as:

$$[X' \ Y' \ Z']^T = \begin{bmatrix} \cos\alpha & 0 & 0 \\ \sin\alpha & 1 & \sin\beta \\ 0 & 0 & \cos\beta \end{bmatrix} * [X \ Y \ Z]^T$$

where $[X \ Y \ Z]^T$ represents distorted point coordinates, $[X' \ Y' \ Z']^T$ represents corrected 3D point coordinates, and α and β are the error correction model parameters, respectively.

7. The error correction method for the line structured light 3D camera according to claim 6, wherein the operation of calculating the error correction model parameters according to the space vector constraint relationship between the corner points on the 3D calibration plate comprises the following steps:

determining the space vector constraint relationship between the corner points on the 3D calibration plate, comprising that the square plane of the 3D calibration plate satisfies that a inner product of diagonal vectors is 0 and that two diagonal module lengths of the square plane of the 3D calibration plate are √2 times side lengths of the square plane;

setting a square of a inner product of a single set of corrected diagonal vectors of the 3D calibration plate as an objective function, wherein the objective function is expressed by the corner point coordinates and the error correction model parameters;

using a Lagrange multiplier method to solve the objective function, and setting an optimization function according to multiple sets of corner point data of the 3D calibration plate;

setting constraints in the Lagrange multiplier method as that the square plane of the 3D calibration plate satisfies that the inner product of the diagonal vectors is 0 and that the two diagonal module lengths of the square plane of the 3D calibration plate are √2 times the side lengths of the square plane; and establishing a Lagrangian function, setting a first-order partial derivative of the Lagrangian function for each error correction model parameter and the Lagrangian multiplier to be equal to zero, and solving the function to obtain the error correction model parameters.

8. The error correction method for the line structured light 3D camera according to claim 7, wherein the operation of solving the function to obtain the error correction model parameters according to the space vector constraint relationship between the corner points on the 3D calibration plate comprises:

setting the error correction model as $x_1 = \cos\alpha$, $x_2 = \sin\alpha$, $x_3 = \sin\beta$, $x_4 = \cos\beta$, and arranging the four corner points of the square plane of the 3D calibration plate clockwise respectively as A, B, C and D, satisfying, after correction, that the inner product of the diagonal vectors is 0, expressed as $\overrightarrow{AC} \cdot \overrightarrow{BD} = 0$, and that the two diagonal module lengths are √2 times the side lengths of the square plane, expressed $|\overrightarrow{AC}| = |\overrightarrow{BD}| = \sqrt{2}L$, where L is the side length of the square plane of the 3D calibration plate;

setting the square of the inner product of the single set of the corrected diagonal vectors of the 3D calibration plate as the objective function:

$$f(x_1, x_2, x_3, x_4) = \left(\overrightarrow{AC} * \overrightarrow{BD}\right)^2 = ((P_c - P_a) \cdot (P_d - P_b))^2 = ((\Delta X_{ac} * x_1, \Delta Y_{ac} + \Delta X_{ac} * x_2 + \Delta Z_{ac} * x_3, \Delta Z_{ac} * x_4) \cdot (\Delta X_{bd} * x_1, \Delta Y_{bd} + \Delta X_{bd} * x_2 + \Delta Z_{bd} * x_3, \Delta Z_{bd} * x_4))^2$$

where $\Delta X_{bd}$ represents a X-axis coordinate difference of two points B and D, $\Delta Y_{bd}$ represents a Y-axis coordinate difference of the two points B and D, $\Delta Z_{bd}$ represents a Z-axis coordinate difference of the two points B and D; $\Delta X_{ac}$ represents a X-axis coordinate difference of two points A and C, $\Delta Y_{ac}$ represents a Y-axis coordinate difference of the two points A and C, and $\Delta Z_{ac}$ represents a Z-axis coordinate difference of the two points A and C;

solving the objective function on the basis of the Lagrange multiplier method, and setting the optimization function as:

$$F(X) = \sum_{i=1}^{n} f_i(x_1, x_2, x_3, x_4)$$

where n is a number of imaging times of the 3D calibration plate at the different positions, and $f_i(x_1,x_2,x_3,x_4)$ is the objective function of the 3D calibration plate during an i-th imaging;

setting the optimization function to satisfy the constraints:

$$\begin{cases} \varphi_1(x_1, x_2, x_3, x_4) = |\overrightarrow{AC}| = |\Delta X_{ac} * x_1, \Delta Y_{ac} + \\ \Delta X_{ac} * x_2 + \Delta Z_{ac} * x_3, \Delta Z_{ac} * x_4| - L * \sqrt[2]{2} \\ \varphi_2(x_1, x_2, x_3, x_4) = |\overrightarrow{BD}| = |\Delta X_{bd} * x_1, \Delta Y_{bd} + \\ \Delta X_{bd} * x_2 + \Delta Z_{bd} * x_3, \Delta Z_{bd} * x_4| - L * \sqrt[2]{2} \\ \varphi_3(x_1, x_2) = \arccos(x_1) - \arcsin(x_2) \\ \varphi_4(x_3, x_4) = \arcsin(x_3) - \arccos(x_4) \end{cases}$$

and satisfy the φi(x)=0, i=1, 2, 3, 4;

establishing a Lagrangian function $F((x_1,x_2,x_3,x_4,\lambda_1,\lambda_2,\lambda_3,\lambda_4) = \sum_{i=1} f_i(x_1,x_2,x_3,x_4) + \sum_{i=1}^{4} \lambda_i * \varphi_i(x_1,x_2,x_3,x_4)$ wherein $\lambda_i$ is called the Lagrange multiplier; and calculating partial derivatives for $x_1,x_2,x_3,x_4,\lambda_i$ respectively, and then setting the partial derivatives as 0 and calculating $x_1,x_2, x_3,x_4$ as the error correction model parameters, which are extreme points in the case where the optimization function satisfies the constraints.

9. A computer device, comprising: a processor, a memory and a program; wherein the program is stored in the memory, and the processor calls the program stored in the memory to execute the error correction method for the line structured light 3D camera according to claim 1.

10. A non-transitory computer-readable storage medium, wherein the computer-readable storage medium is configured to store a program, the program being configured to execute the error correction method for the line structured light 3D camera according to claim 1.

* * * * *